(12) United States Patent
Rosen et al.

(10) Patent No.: US 8,596,967 B2
(45) Date of Patent: Dec. 3, 2013

(54) TURBINE SHROUD FOR AIR CYCLE MACHINE

(75) Inventors: Seth E. Rosen, Middletown, CT (US); Craig M. Beers, Wethersfield, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 521 days.

(21) Appl. No.: 12/974,219

(22) Filed: Dec. 21, 2010

(65) Prior Publication Data

US 2012/0156018 A1  Jun. 21, 2012

(51) Int. Cl.
*F01D 25/24* (2006.01)
(52) U.S. Cl.
USPC .................................................. 415/173.1
(58) Field of Classification Search
USPC .......................................... 415/170.1, 173.1
See application file for complete search history.

(56) References Cited

U.S. PATENT DOCUMENTS

| | | | |
|---|---|---|---|
| 4,967,565 A | 11/1990 | Thomson et al. | |
| 5,014,518 A | 5/1991 | Thomson et al. | |
| 5,113,670 A | 5/1992 | McAuliffe et al. | |
| 5,133,194 A | 7/1992 | Army, Jr. et al. | |
| 5,142,762 A | 9/1992 | Dziorny et al. | |
| 5,224,842 A | 7/1993 | Dziorny et al. | |
| 5,249,934 A | 10/1993 | Merritt et al. | |
| 5,309,735 A | 5/1994 | Maher, Jr. et al. | |
| 5,310,311 A | 5/1994 | Andres et al. | |
| 5,311,749 A * | 5/1994 | McAuliffe et al. | 62/402 |
| 5,784,894 A | 7/1998 | Army, Jr. et al. | |
| RE36,101 E | 2/1999 | Andres et al. | |
| 5,921,683 A | 7/1999 | Merritt et al. | |
| 6,058,715 A | 5/2000 | Strang et al. | |
| 6,427,471 B1 | 8/2002 | Ando et al. | |
| 7,502,717 B2 | 3/2009 | Elpern et al. | |
| 7,779,644 B2 | 8/2010 | Decrisantis et al. | |
| 2007/0160466 A1 * | 7/2007 | Keller | 415/170.1 |
| 2008/0109195 A1 * | 5/2008 | Dischinger et al. | 703/7 |
| 2012/0063894 A1 * | 3/2012 | Chen et al. | 415/213.1 |

* cited by examiner

*Primary Examiner* — Edward Look
*Assistant Examiner* — Liam McDowell
(74) *Attorney, Agent, or Firm* — Carlson, Gaskey & Olds, PC

(57) ABSTRACT

A turbine shroud for an air cycle machine includes a wall inner surface which at least partially defines a turbine flowpath, the wall inner surface defined by set of points in Table T-1 scaled by a desired factor.

15 Claims, 3 Drawing Sheets

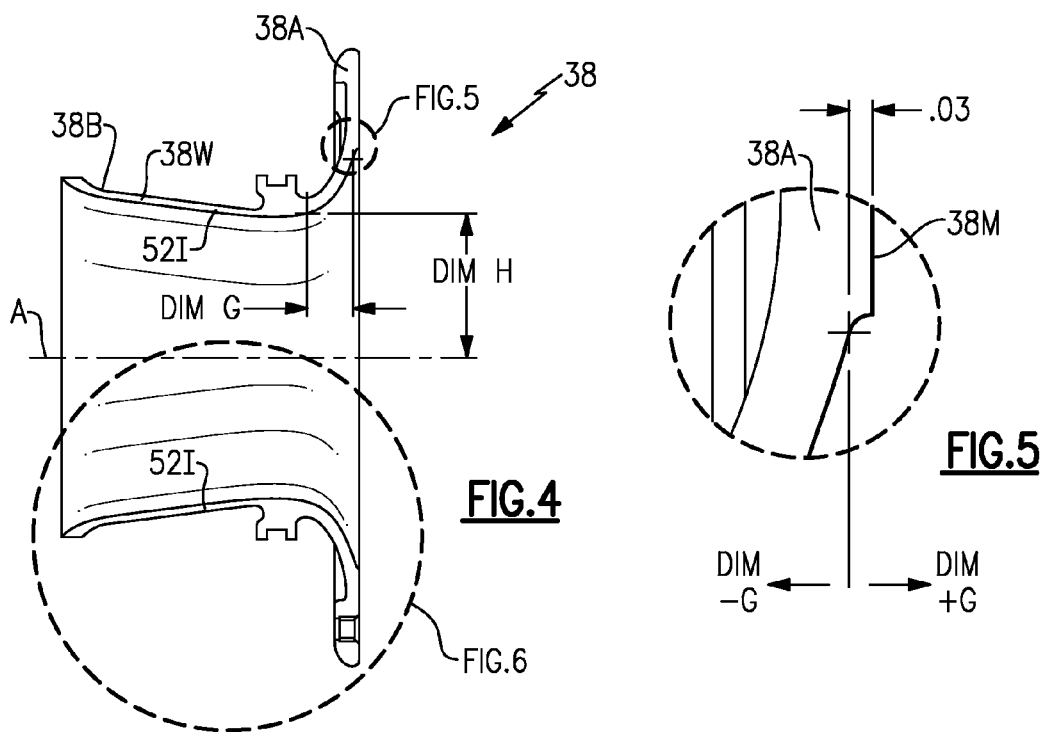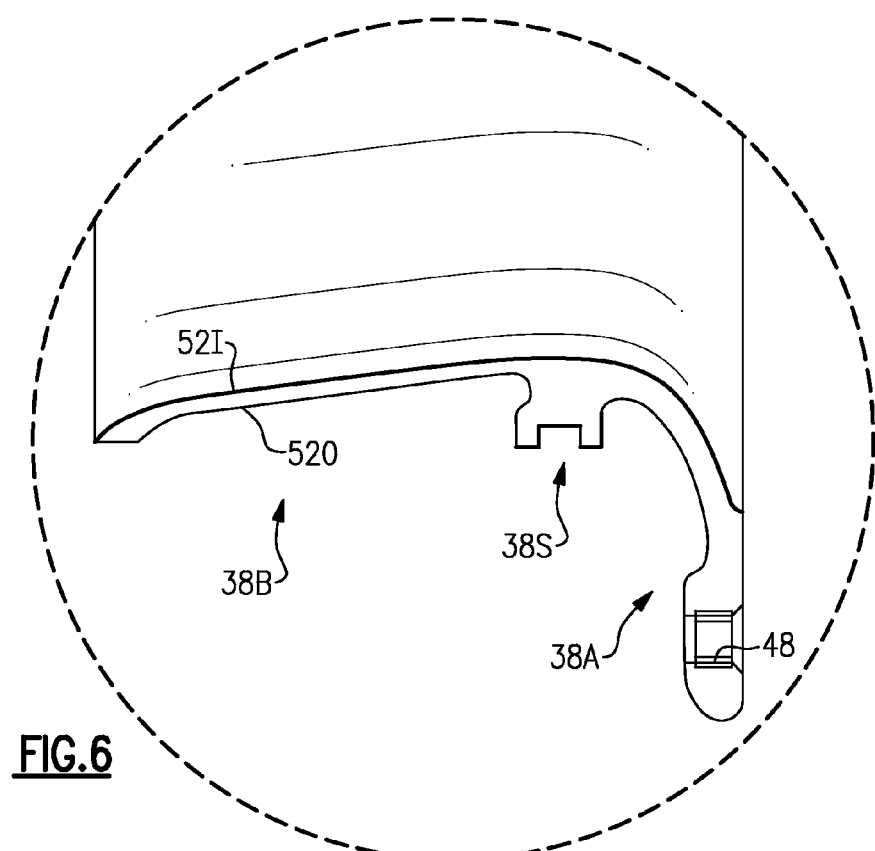

TURBINE SHROUD FOR AIR CYCLE MACHINE

BACKGROUND

The present disclosure relates to an air cycle machine, and more particularly to a turbine shroud therefor.

An air cycle machine may include a centrifugal compressor and a centrifugal turbine mounted for co-rotation on a shaft. The centrifugal compressor further compresses partially compressed air, such as bleed air received from a compressor of a gas turbine engine. The compressed air discharges to a downstream heat exchanger or other system before return to the centrifugal turbine. The compressed air expands in the turbine to thereby drive the compressor. The air output from the turbine may be utilized as an air supply for a vehicle such as the cabin of an aircraft.

SUMMARY

A turbine shroud for an air cycle machine according to an exemplary aspect of the present disclosure includes a wall inner surface which defines a turbine flowpath, the wall inner surface defined by a set of points in Table T-1 scaled by a desired factor, the set of points include paired radial dimensions from a centerline of the turbine shroud and axial dimensions from a flange mount surface.

An air cycle machine according to an exemplary aspect of the present disclosure includes a turbine shroud having a wall inner surface which at least partially defines a turbine flowpath, the wall inner surface defined by a set of points in Table T-1 scaled by a desired factor, the set of points include paired radial dimensions from a centerline of the turbine shroud and axial dimensions from a flange mount surface.

A method of assembling an Air Cycle Machine according to an exemplary aspect of the present disclosure includes mounting a turbine shroud to a turbine nozzle to at least partially define a turbine flowpath with a wall inner surface, the wall inner surface defined by a set of points in Table T-1 scaled by a desired factor, the set of points include paired radial dimensions from a centerline of the turbine shroud and axial dimensions from a flange mount surface.

BRIEF DESCRIPTION OF THE DRAWINGS

Various features will become apparent to those skilled in the art from the following detailed description of the disclosed non-limiting embodiment. The drawings that accompany the detailed description can be briefly described as follows:

FIG. 4 is a sectional view of the turbine shroud taken along line 4-4 in FIG. 3;

FIG. 5 is an expanded view of the turbine nozzle which illustrates where an inner surface defined herein begins; and FIG. 6 is an expanded sectional view of a turbine shroud illustrating related thickness sections thereof.

DETAILED DESCRIPTION

Figure 1:
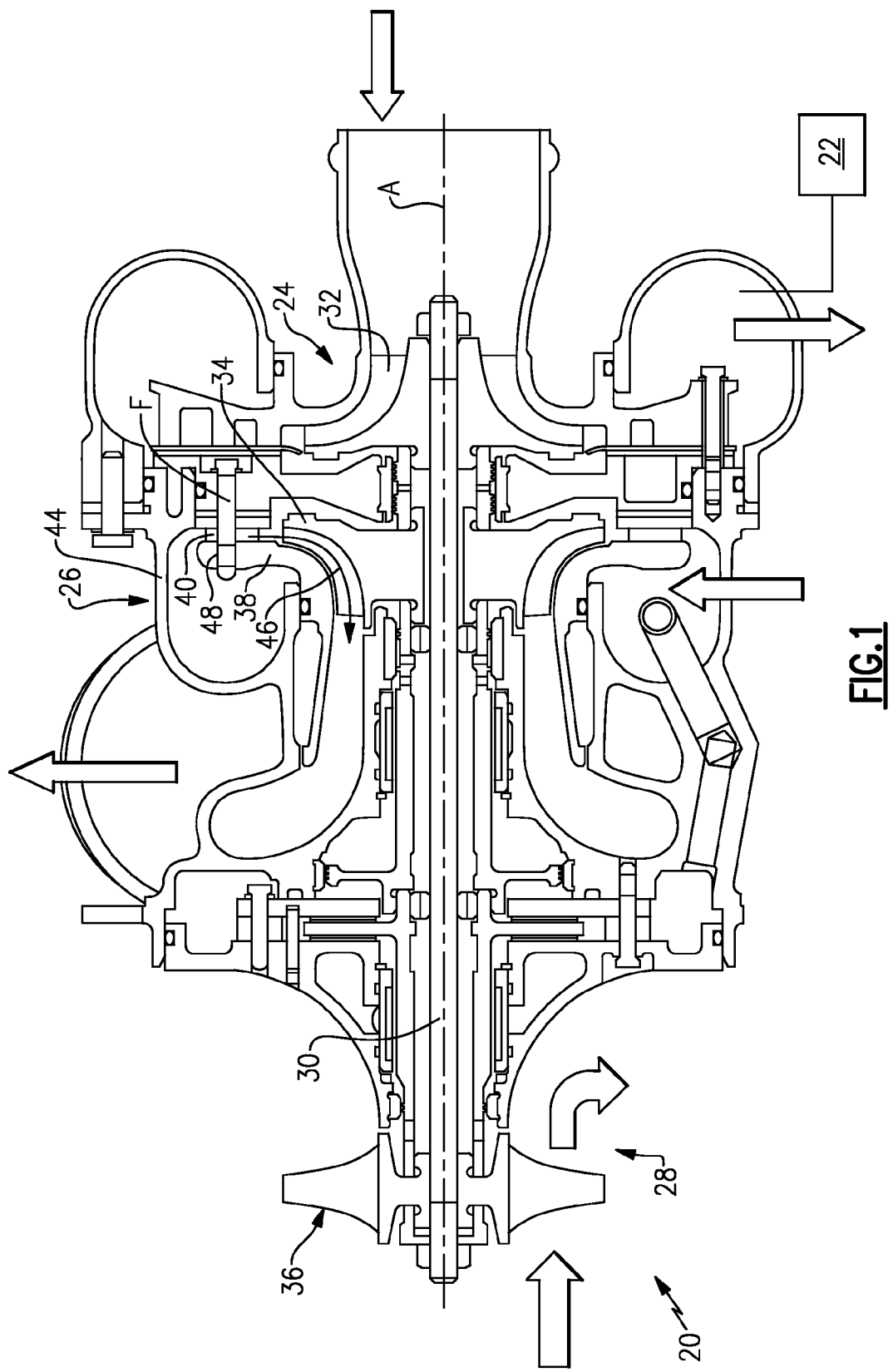
FIG. 1 illustrates a schematic sectional view of an example air cycle machine.

FIG. 1 schematically illustrates an example air cycle machine 20 ("ACM") that is incorporated into an air supply system 22 of a vehicle, such as an aircraft, helicopter, or land-based vehicle. The ACM 20 includes a compressor section 24, a turbine section 26 and a fan section 28 that are generally disposed about a main shaft 30, such as a tie rod. The compressor section 24 includes a compressor rotor 32, the turbine section 26 includes a turbine rotor 34, and the fan section 28 includes a fan rotor 36. The compressor rotor 32, turbine rotor 34, and fan rotor 36 are secured on the main shaft 30 for co-rotation about an axis A.

The turbine section 26 generally includes the turbine rotor 34, a turbine shroud 38 and a turbine nozzle 40 contained within a turbine housing section 44. The turbine section 26 is located axially between the fan section 28 and the compressor section 24. The turbine shroud 38 is attached axially downstream of the turbine nozzle 40 to define a turbine flowpath 46 for the turbine rotor 34.

Figure 2:
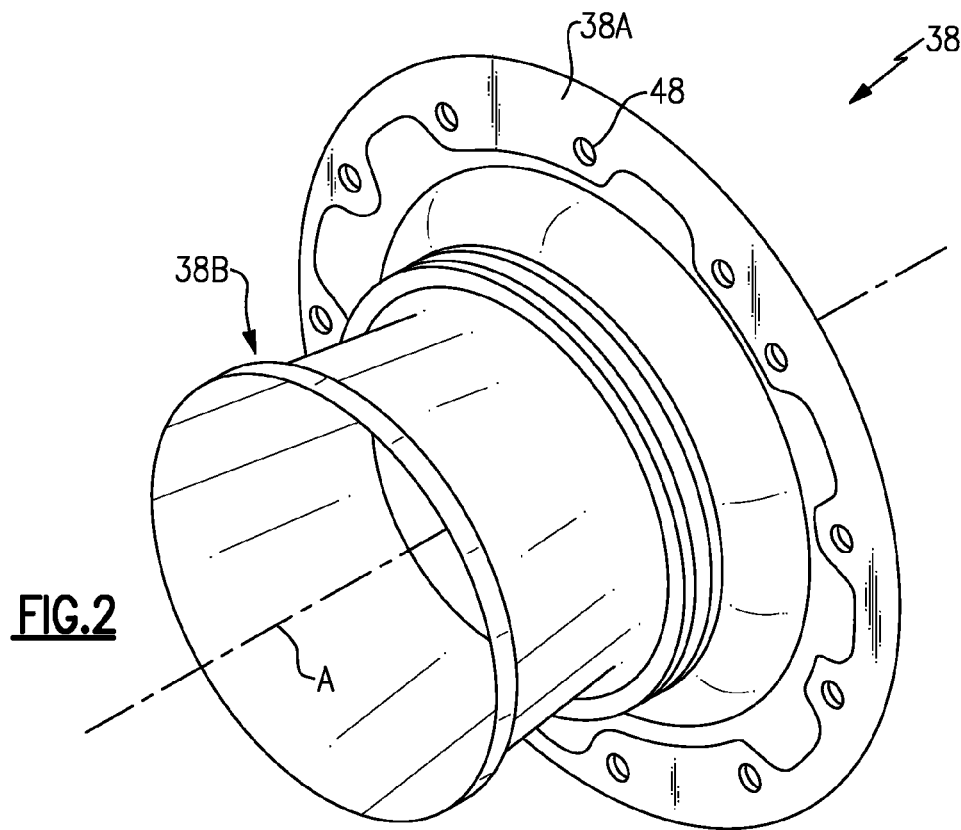
FIG. 2 illustrates a perspective view of a turbine shroud.
Figure 3:
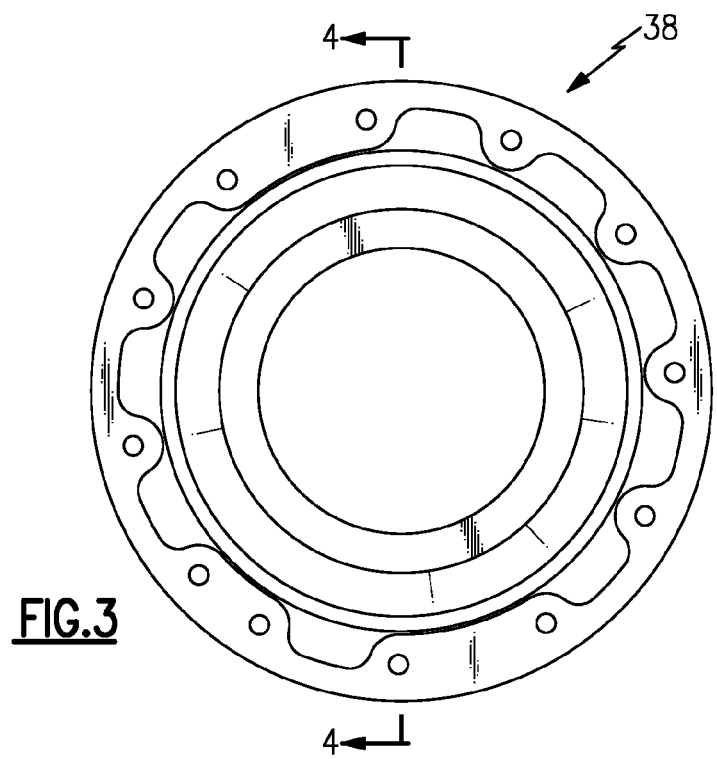
FIG. 3 illustrates a front view of the turbine shroud.

With reference to the perspective view of the turbine shroud 38 shown in FIG. 2, the front view of FIG. 3 and the cross-sectional view of FIG. 4, the turbine shroud 38 generally includes a flange section 38A and a shroud section 38B defined about the central axis A. The flange section 38A includes apertures 48 to receive fasteners F for attachment of the turbine shroud 38 to the turbine nozzle 40 and other structure (FIG. 1).

The turbine flowpath 46 is defined from the flange section 38A through the shroud section 38B then out through the turbine housing section 44. The shape of the turbine flowpath 46 may be designed using, for example, computational fluid dynamics (CFD) analytical software and is optimized to meet the specific performance requirements of the applicable ACM. With an optimized turbine flowpath 46, the distribution of turbine flow from the radial turbine inlet to the axial turbine outlet minimizes energy losses due to flow disturbances or recirculation of the air along the inlet flowpath. It should be understood that additional constraints, such as limits in axial length of the ACM may alternatively or additionally be considered for optimization of the inlet flowpath. The process can be used to create uniquely optimized flowpaths to meet different performance requirements and can be scaled up or scaled down to meet different ACM performance requirements.

With reference to FIG. 4, the turbine shroud 38 includes a wall 38W which defines a relatively smooth wall inner surface 52I. The wall inner surface 52I defines the turbine flowpath 46. The shape of the wall inner surface 52I is designed to closely match the adjacent rotor blade tip contour of the turbine rotor 34 with offset clearance to provide a desired rotor performance.

Because of the difficulty involved in giving an adequate word description of the particular wall inner surface 52I being described herein, coordinates for one non-limiting embodiment therefore are set forth in Table T-1. The wall inner surface 52I is dimensionally defined by an axial dimension G based from a mount surface 38M off the flange section 38A (FIG. 5) to the wall inner surface 52I combined with a radial dimension H from the axis A to the wall inner surface 52I. The paired dimensions G, H in Table T-1 to define the wall inner surface 52I of the turbine shroud 38. Three dimensional definition is then accomplished by revolving the wall inner surface 52I about the centerline A.

TABLE T-1

SHROUD CONTOUR TABLE

| G | H |
|---|---|
| .0083 | 1.5384 |
| .0000 | 1.5100 |

TABLE T-1-continued

SHROUD CONTOUR TABLE

| G | H |
|---|---|
| −.0048 | 1.4941 |
| −.0215 | 1.4427 |
| −.0332 | 1.4096 |
| −.0427 | 1.3846 |
| −.0551 | 1.3539 |
| −.0689 | 1.3220 |
| −.0809 | 1.2961 |
| −.0925 | 1.2730 |
| −.1070 | 1.2461 |
| −.1261 | 1.2143 |
| −.1458 | 1.1858 |
| −.1635 | 1.1637 |
| −.1840 | 1.1416 |
| −.2069 | 1.1211 |
| −.2249 | 1.1076 |
| −.2410 | 1.0971 |
| −.2647 | 1.0845 |
| −.2928 | 1.0727 |
| −.3138 | 1.0658 |
| −.3458 | 1.0573 |
| −.3689 | 1.0526 |
| −.3948 | 1.0484 |
| −.4161 | 1.0457 |
| −.4821 | 1.0398 |
| −.5511 | 1.0363 |
| −.6266 | 1.0343 |
| −.6833 | 1.0342 |
| −.7247 | 1.0342 |
| −.7328 | 1.0344 |
| −.7408 | 1.0352 |
| −1.7896 | 1.1700 |
| −1.9453 | 1.2103 |
| −2.0842 | 1.2890 |
| −2.1943 | 1.3960 |
| −2.2486 | 1.4760 |

With reference to FIG. 6, a wall outer surface 520 of the wall 52 is sized relative to the wall inner surface 52I to provide a thickness optimized to meet rotor containment requirements. Although the flange section 38A flows into the shroud section 38B in a unitary manner, the flange section 38A is separately defined herein from the shroud section 38B by a seal section 38S. In one disclosed non-limiting dimensional embodiment, the shroud section 38B provides a thickness between 0.07-0.03 inches (1.8-0.76 mm) and nominally may be 0.05 inches (1.3 mm) while the flange section 38A provides a thickness between 0.09-0.05 inches (2.3-1.3 mm) and nominally may be 0.07" (1.8 mm) (FIG. 1). In this disclosed non-limiting dimensional embodiment, a thickness ratio is 0.77-0.60.

Table values are computer-generated and shown to four decimal places. However, in view of manufacturing constraints, actual values useful for manufacture of the component are considered to be the valid values to determine the claimed profile of the component. That is, there are typical manufacturing tolerances which must be accounted for in the profile of the component. Accordingly, the values for the profile given in the disclosed Tables are for a nominal component. It will therefore be appreciated that plus or minus typical manufacturing tolerances are applicable to the table values and that a component having a profile substantially in accordance with those values includes such tolerances. For example, a manufacturing tolerance of about +−0.03 inches (0.76 mm) should be considered within design limits for the component. Thus, the mechanical and aerodynamic function of the components is not impaired by manufacturing imperfections and tolerances, which in different embodiments may be greater or lesser than the values set forth in the disclosed Tables. As appreciated by those in the art, manufacturing tolerances may be determined to achieve a desired mean and standard deviation of manufactured components in relation to the ideal component profile points set forth in the disclosed Tables.

In addition, the component may also be coated for protection against corrosion and oxidation after the component is manufactured, according to the values of the Tables and within the tolerances explained above. Consequently, in addition to the manufacturing tolerances for the values set forth in the Tables, there may also be an addition to those values to account for the coating thicknesses. It is contemplated that greater or lesser coating thickness values may be employed in alternative embodiments of the invention.

It should be understood that these representative sections are of one disclosed non-limiting embodiment and that other regions as well as intermediate region sections may be defined herefrom when connected by continuous smooth surfaces.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present invention.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the invention may be practiced other than as specifically described. For that reason the appended claims should be studied to determine true scope and content.

What is claimed:

1. A turbine shroud for an Air Cycle Machine comprising:
    a wall inner surface which at least partially defines a turbine flowpath, said wall inner surface defined by a set of points in Table T-1 scaled by a desired factor, said set of points include paired radial dimensions from a centerline of the turbine shroud and axial dimensions from a flange mount surface of the turbine shroud.

2. The turbine shroud as recited in claim 1, wherein a wall having said wall inner surface defines a thickness defined at least partially for blade containment.

3. The turbine shroud as recited in claim 1, wherein a wall having said wall inner surface defines a shroud section and a flange section.

4. The turbine shroud as recited in claim 3, wherein said flange mount surface is defined by said flange section.

5. The turbine shroud as recited in claim 1, wherein said wall inner surface defined by said set of points in Table T-1 is adjusted by a manufacturing tolerance.

6. The turbine shroud as recited in claim 5, wherein said manufacturing tolerance is about +−0.03 inches (0.76 mm).

7. An Air Cycle Machine comprising:
    a turbine shroud having a wall inner surface which at least partially defines a turbine flowpath, said wall inner surface defined by a set of points in Table T-1 scaled by a desired factor, said set of points include paired radial dimensions from a centerline of the turbine shroud and axial dimensions from a flange mount surface of the turbine shroud.

8. The Air Cycle Machine as recited in claim 7, wherein said turbine shroud is downstream of a turbine nozzle.

9. The Air Cycle Machine as recited in claim 7, further comprising a turbine rotor within said turbine rotor shroud.

10. The Air Cycle Machine as recited in claim 7, wherein said wall inner surface defined by said set of points in Table T-1 is adjusted by a manufacturing tolerance.

11. The Air Cycle Machine as recited in claim 7, wherein said manufacturing tolerance is about +−0.160 inches (4 mm).

12. A method of assembling an Air Cycle Machine comprising:
mounting a turbine shroud to a turbine nozzle to at least partially define a turbine flowpath with a wall inner surface of the turbine rotor shroud, the wall inner surface defined by a set of points in Table T-1 scaled by a desired factor, the set of points include paired radial dimensions from a centerline of the turbine shroud and axial dimensions from a flange mount surface of the turbine shroud.

13. The method as recited in claim 12, further comprising:
mounting the turbine shroud downstream of the turbine nozzle.

14. The method as recited in claim 13, further comprising:
mounting a turbine rotor downstream of the turbine nozzle and within the turbine shroud.

15. The method as recited in claim 12, further comprising:
adjusting the wall inner surface defined by the set of points in Table T-1 by a manufacturing tolerance.

\* \* \* \* \*